United States Patent
Del Grande et al.

[15] 3,636,559
[45] Jan. 18, 1972

[54] ULTRASONIC RAT ELIMINATION SYSTEM HAVING RANDOM MODULATION

[72] Inventors: Dominic Del Grande, North Hollywood; Donald C. Erdman, Pasadena both of Calif.

[73] Assignee: The Rat Elimination System Limited, Nassau, Bahamas

[22] Filed: Nov. 18, 1968

[21] Appl. No.: 776,646

[52] U.S. Cl. ............................................340/384, 340/388
[51] Int. Cl. ..........................................................G08b 3/10
[58] Field of Search......................................340/384, 384 E

[56] References Cited

UNITED STATES PATENTS

| | | | |
|---|---|---|---|
| 2,826,691 | 3/1958 | Elliot | 340/384 E |
| 3,160,877 | 12/1964 | Monomakhoff | 340/384 E |
| 3,254,336 | 5/1966 | Campbell | 340/384 E |
| 3,466,649 | 9/1969 | Colman | 340/384 E |
| 2,922,999 | 1/1960 | Carlin | 340/384 E |
| 3,051,944 | 8/1962 | Smith | 340/384 E |
| 3,165,734 | 1/1965 | Grodzinsky | 340/384 E |
| 3,173,136 | 3/1965 | Atkinson | 340/384 E |
| 3,196,432 | 7/1965 | Kock | 340/384 E |

Primary Examiner—Harold I. Pitts
Attorney—Christie, Parker & Hale

[57] ABSTRACT

Apparatus and method for repelling rats and mice from an area by means of generation of a modulated ultrasonic sound level. The sound level is frequency modulated within a range of ultrasonic frequencies to which rats and mice respond. In addition, it is amplitude modulated in a random manner. The modulations of the signal prevent rats and mice from adapting to the sound, and thereby renders the sound particularly unpleasant to them.

11 Claims, 3 Drawing Figures

ULTRASONIC RAT ELIMINATION SYSTEM HAVING RANDOM MODULATION

BACKGROUND OF THE INVENTION

This invention relates to the control of pests and, more particularly, to an apparatus and method for repelling rats and mice. Mice and, more particularly, rats, have long been recognized as carriers of disease and as extremely dangerous and destructive pests. The common rat has, in fact, been called probably the most injurious and universal pest of the human race. An advantage of the present invention is that it is highly efficient in eliminating these pests from an area in which this invention is used.

Prior attempts to control these pests have generally required the use of traps with attendant fuss and bother with bait as well as dirty cleanup work. Another advantage of the present invention is that it completely eliminates the need for traps, bait and cleanup work.

Another advantage of the present invention is that it drives rats and mice from their habitat without killing them.

It has long been known that rats and mice are startled by high-frequency sound. The degree of reaction varies from a state of nervousness at low-sound energies on up to audiogenic seizure when the sound level is higher. Studies have shown that almost any frequency within the 20–40 kHz. range will cause convulsion in rats if the sound level is in the 130–140 decibel range. Such sound intensities are difficult to obtain in large areas such as grain storage areas or market places. Additionally, there is danger of the pests adapting themselves to a signal of constant frequency or to a signal which follows a repetitive uniform pattern.

Yet another advantage of the present invention is that it repels rats and mice by means of ultrasonic sound levels of lower magnitude than those heretofore thought to be required for the elimination of such pests.

Yet another advantage of the present invention is that if repels rats and mice by means of ultrasonic sound signals which do not follow a uniform pattern to which the pests could acclimate themselves.

Still another advantage of the present invention it that it provides a highly efficient method of eliminating and preventing the damage and hazards caused by rats and mice.

SUMMARY OF THE INVENTION

In brief, the preceding and additional objects are achieved by means of the production of ultrasonic signals which are constantly modulated with respect to frequency. We have found that startle reactions and often clonic seizures can be induced in rats and mice at sound levels as low as 100–120 decibels if the frequency of the generated sound is swept between 18.5 and 30 kHz. It is believed that the reactions obtained at such lower sound levels are achieved because the pests are unable to acclimate themselves to the changing frequency of the signal. It has further been found that adding amplitude modulation to the signal in a fairly random manner aids in preventing the pests from adapting to and therefore ignoring the sound. Such modulation makes the sound extremely unpleasant. Signals within the suggested frequency range are not only above the upper frequency limit to which human beings respond, but are also above the level to which dogs, cats and other household pets respond.

In accordance with the present invention, rats and mice may be effectively eliminated from an area of up to 10,000 square feet by means of the generation of an electrical signal within the ultrasonic frequency range; modulating the signal, by causing the frequency to repetitively sweep within a predetermined frequency range and by simultaneously modulating the amplitude of the signal; and by then converting the electrical signal to air vibrations in order to produce an ultrasonic sound level of at least 100 decibels. It is likely that in smaller areas a sound level of even less than 100 decibels may be sufficient to eliminate rats therefrom.

In another embodiment, a speaker for converting the electrical signal to ultrasonic sound is repeatedly switched on and off in order to provide an interrupted output. This permits the speaker to cool off during the interruptions in the output signal. The interruptions do not have any detected effect upon the rat repelling action and, in fact, may indeed further increase the rat repelling effect if the interruptions are also made to occur in a random manner.

Yet another embodiment of the present invention utilizes a plurality of speakers which are sequentially operated to provide the ultrasonic output sound levels. By using three such speakers, for example, two of the three speakers may constantly be cooling off while the third is operating.

BRIEF DESCRIPTION OF THE DRAWING

The foregoing and other features of this invention may more readily be understood by reference to the accompanying drawing wherein.

DETAILED DESCRIPTION

Figure 1:
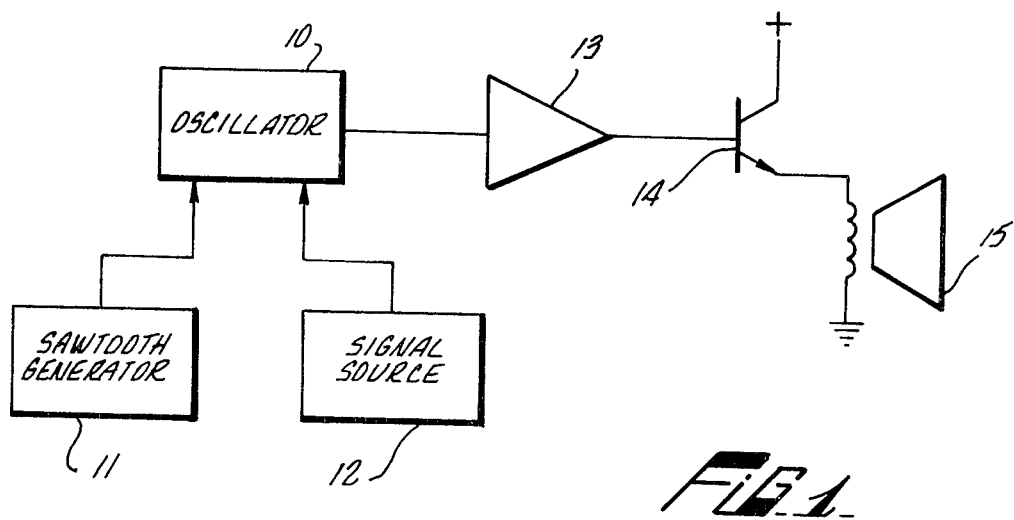
FIG. 1 is a block diagram of one embodiment of the present invention.

FIG. 1 depicts a preferred embodiment of the present invention. Oscillator 10 is a square wave generator which can be both amplitude and frequency modulated. Such generators are well known in the art. Typical of such generators are unijunction relaxation oscillators in which the voltage to the time constant charging resistor is varied in order to achieve frequency modulation, and the "Base 2" voltage is varied in order to modulate the amplitude of the output. Sawtooth generator 11 is used to modulate the frequency of the output of oscillator 10 and signal source 12 is utilized to modulate the amplitude of the output of oscillator 10. The output of the sawtooth generator 11 causes a periodic sweeping of the frequencies generated by oscillator 10.

Advantageously, oscillator 10 is caused to produce an output signal, the frequency of which is periodically swept between approximately 18.5 kHz. and 30 kHz. The range of the frequencies swept may, of course, be modified somewhat so long as the frequencies are all above the level to which human beings respond. An upper frequency of about 30 kHz. is sufficient, but this upper frequency could also be increased so long as the frequencies used continue to produce responses in the pests being eliminated.

The output wave form of oscillator 10 is preferably a square wave. The waveform should have quick rise and fall times in order to maximize to generation of sidebands. If an oscillator is utilized which produces a pulse rather than a square wave, the pulse output could be transformed into a square wave by additional circuitry according to well-known techniques. When this approach is utilized, the amplitude modulating signal would advantageously be applied to this latter circuitry thereby amplitude modulating the square wave rather than the output of the oscillator. Sawtooth generator 11 may have a period of typically 1 to 10 seconds although this period is not critical.

The signal source 12 may advantageously comprise a source for producing a 120 cycle, rectified, sinusoidal signal. It is preferable that the amplitude modulation be applied to the signal in a fairly random manner since such random modulation aids further in preventing the rat from adapting to and therefore ignoring the generated sound. Such random modulation can be achieved by insuring that signal source 12 is not phase locked with sawtooth generator 11. Alternatively, a random noise generator could be substituted for source 12, or source 12 could be eliminated altogether if a poorly filtered power supply were used to feel oscillator 10. It is preferable, however, to use a separate source 12 in order to eliminate from other elements of the system the hum which would be produced by using a poorly filtered power supply.

The output of oscillator 10 is amplified by amplifier 13 and then fed an emitter follower circuit 14 which is used to drive an electrodynamic speaker 15. Amplifier 13 may comprise any well-known amplifier capable of amplifying the output signal to a level sufficient to produce the desired sound level from speaker 15. Emitter follower circuit 14 may comprise well-known transistor circuitry symbolically shown in FIG. 1. Speaker 15, of the electrodynamic type, can produce an output sound level of as much as 120 decibels if it is built with a very stiff cone and has a good heat dissipation construction. Alternatively, speakers of the corona type or of the electrostatic type could be utilized.

Figure 2:
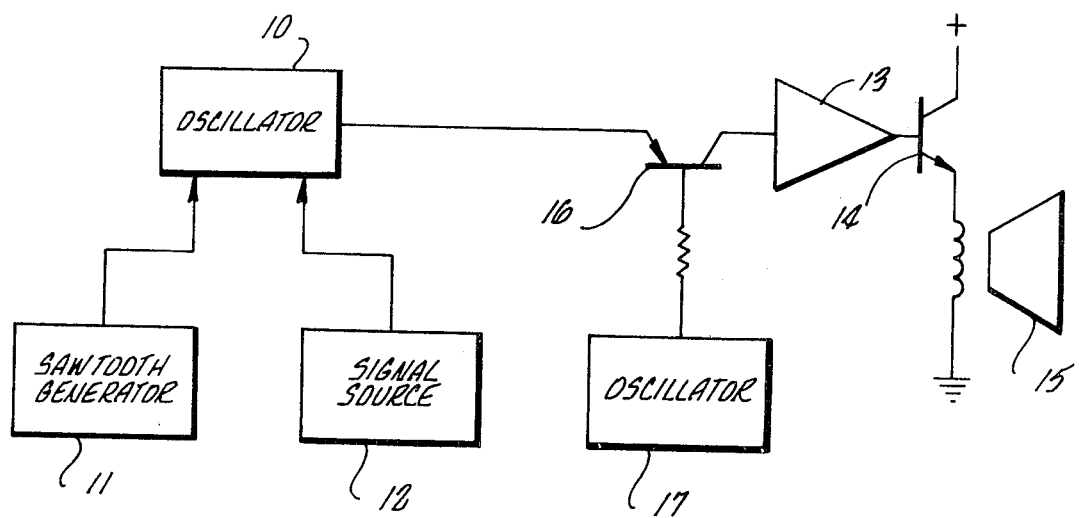
FIG. 2 is a block diagram of a second embodiment of the present invention.

FIG. 2 depicts another embodiment of the present invention, and elements common to both FIGS. 1 and 2 bear the same reference characters. The circuit shown in FIG. 2 differs from that in FIG. 1 by the addition of a series switch 16 and a free-running square wave oscillator 17. The switch 16 may, for example, comprise well-known transistor circuitry and is symbolically shown in FIG. 2 as a transistor. Oscillator 17 produces a signal during one-half of each cycle which closes switch 16. Switch 16 couples the output signal of output 10 to amplifier 13 only when a signal is present on the base of transistor 16 from oscillator 17. If, for example, oscillator 17 has a period of approximately 100 seconds, an interrupted output from speaker 15 will be produced which will be on for 100 seconds and then off for 100 seconds. By utilizing such an interrupted output, the voice coil of electrodynamic speaker 15 is allowed to cool one-half of the time. This interruption in the output does not appear to have any detected effect upon the rat-repelling action of the invention. The interruption may, indeed, increase the rat-repelling effect if oscillator 17 is out of synchronism with both sawtooth generator 11 and signal source 12.

Figure 3:
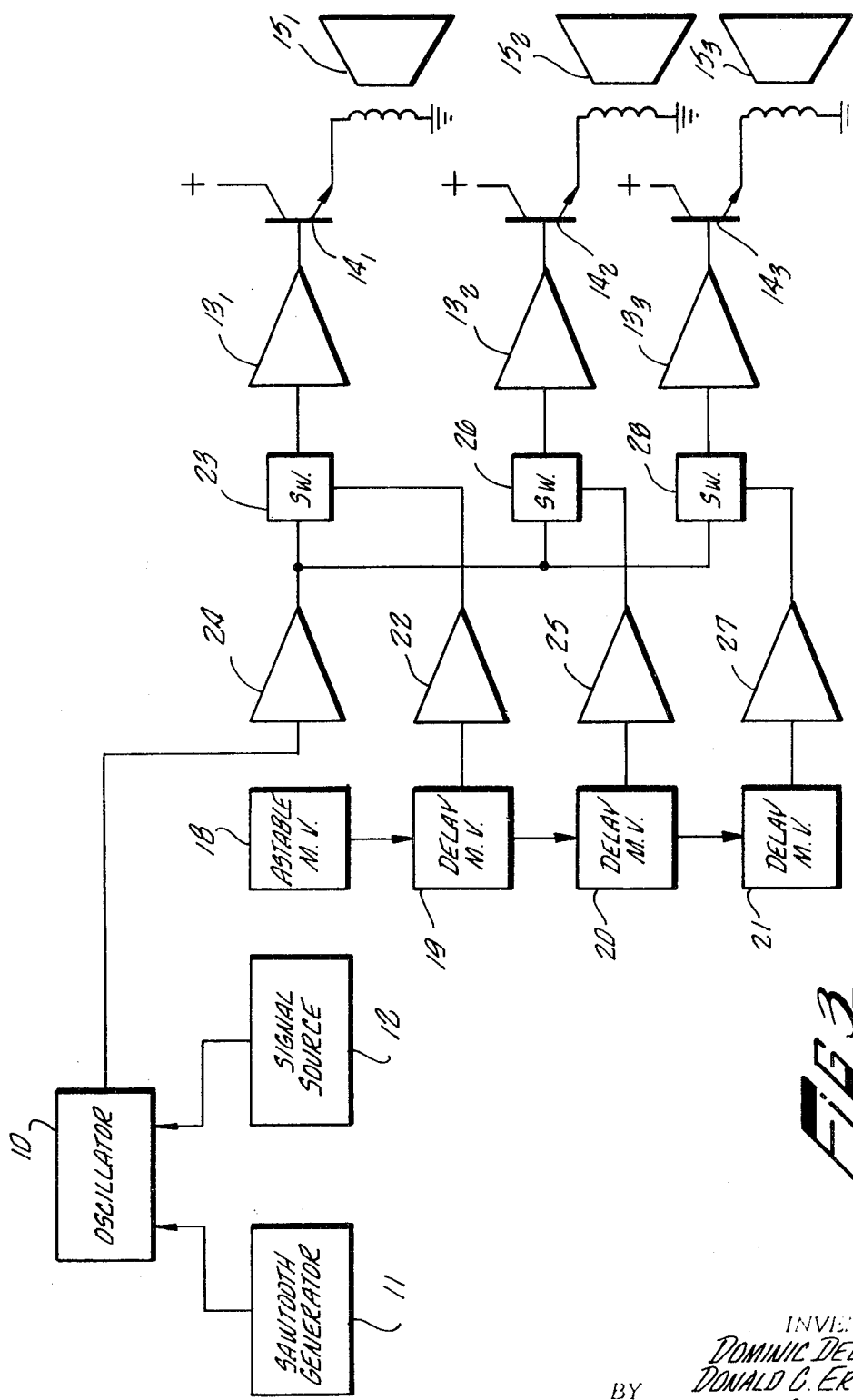
FIG. 3 is a block diagram of a third embodiment of the present invention.

FIG. 3 depicts yet another embodiment of the present invention. Elements in FIG. 3 common to FIGS. 1 and 2 bear the same reference characters. FIG. 3 depicts three electrodynamic speakers $15_1$, $15_2$ and $15_3$ which are sequentially coupled to the output signal of oscillator 10 in order to allow two of the speakers to cool while the third is operating. An astable multivibrator 18 and three-delay multivibrators 19, 20 and 21, are utilized to sequentially couple to output signal from oscillator 10 to the three speakers $15_1$, $15_2$ and $15_3$. Each of the delay multivibrators 19, 20 and 21, will advantageously have a period equal to one-third of the time interval between pulses produced by the astable multivibrator 18. Thus, for example, if astable multivibrator 18 produces pulses every 3 seconds, the delay multivibrators will have a period of about 1 second.

Initially, a signal from multivibrator 18 will energize delay multivibrator 19. An output signal from multivibrator 19, amplified by amplifier 22, will open switch 23 enabling the output signal from oscillator 10, amplified by amplifier 24, to pass to amplifier $13_1$ and thence to drive speaker $15_1$ via emitter follower circuitry $14_1$. After 1 second, delay multivibrator 19 will cease to operate and delay multivibrator 20 will be energized. The signal from delay multivibrator 20, amplified in amplifier 25, will open switch 26 and enable the signal from oscillator 10 to drive speaker $15_2$. After another second, delay multivibrator 20 will cease to operate and delay multivibrator 21 will be energized. The signal from delay multivibrator 21, amplified in amplifier 27, will open switch 28 and enable the output signal from oscillator 10 to drive speaker $15_3$. After another second, delay multivibrator 21 will cease to operate and at this time another pulse will be produced by astable multivibrator 18 causing the entire sequence to repeat. In this manner, the speakers, $15_1$, $15_2$ and $15_3$ are sequentially coupled to the oscillator 10.

The multivibrators shown in FIG. 3 in block diagram form may comprise any well-known multivibrator circuits capable of performing the operations described herein. The switches 23, 26, and 28 shown in block diagram form, may comprise any of a number of well-known types of switches such as well-known transistor switching circuits. The switches shown in FIG. 3 as serial switches may alternatively be connected in parallel fashion. Additionally, the signal from oscillator 10 could be sequentially coupled to the three speakers $15_1$, $15_2$ and $15_3$ by means of other switching arrangements such as by mechanically operated rotary switches.

The period of the multivibrators 18, 19, 20 and 21 is not critical and could, for example, be designed such that multivibrator 18 is produced a pulse at intervals such as 90 seconds with each of the delay multivibrators then having a period of 30 seconds.

The sound emissions produced in accordance with the present invention have been found to be sufficient to cause rats and mice to leave the area in which the sounds are being produced, although the sound is inaudible to human beings and household pets. It has been found that the invention is effective in an area up to 10,000 square feet subject to various construction barriers, acoustically dampened areas and to the ambient sound level. If the ambient sound level at the infested area is below the 20 decibel range for at least 10 to 12 hours out of a 24 hour period, it has been found that rats will disappear from the area within 72 hours. Although occasional "scout" rats may subsequently be occasionally observed, damage from rats will be effectively eliminated.

Use of the present invention will effectively banish rats from the area in which the invention is used as long as the invention is kept operational even if used only at night. The modulation applied to the generated signal causes the sound to be particularly painful to the rats and prevents them from building up an immunity to the sound.

The present invention is not designed to kill rats and mice but to drive them from their habitat. Where the present invention is utilized in a known infested area, rats will seek an escape from the area within the range of the sound field and will not return so long as the sound is being produced. It is advisable that a means of escape be provided for the rats. If no such escape means is provided, they will run to the farthest distance from the sound and stay in a huddled position so long as the sound is being produced. During this time they will not be active and will not eat or drink.

When a rat colony has been forced to leave infested territory because of use of the present invention, they will seek another habitat. If their newly selected habitat is also rat infested, the invading rats will be attacked by the rats living in the newly selected habitat. This behavior of rats is described, for example, in an article entitled "*Rats*" by S. A. Barnett appearing at pages 78 through 85 of the Jan., 1967 issue of Scientific American magazine.

This last cited article also documents the reason for the lack of success in the use of traps baited with food. When rats are living in a familiar environment, any new food or any other new object is initially avoided. Thus, the rats will initially avoid any bait set out for them. Additionally, a strange food avoided at first is later sampled in small amounts. If it is toxic there is time for the ill effects from a small dose to develop and the rat thereafter, for many months, will refuse such bait and anything that tastes like it. Thus, it is apparent that such prior art techniques can never be very successful in eliminating rats. The present invention, however, achieves the virtual elimination of these pests within a relatively short period of time.

What have been described are considered to be only illustrative embodiments of the present invention, and accordingly it is to be understood that various and numerous other arrangements can be devised by one skilled in the art without departing from the spirit and scope of this invention.

What is claimed is:

1. An ultrasonic random noise generating apparatus for repelling rats and mice comprising:

a square wave generator for generating a periodically varying electric signal within the ultrasonic frequency range;

first signal source means connected to the generator for repetitiously cycling the frequency of said periodically varying electric signal over a predetermined ultrasonic frequency range;

second signal source means connected to the generator for modulating the amplitude of said periodically varying electric signal out of phase with the frequency cycling means; and speaker means coupled to the square wave generator for converting the modulated and cycled periodically varying electric signal to air vibrations.

2. Apparatus according to claim 1 in which the frequency modulating means sweeps the frequency of the generator within the range of 18.5 kHz. to 30 kHz.

3. Apparatus according to claim 2 further comprising an amplifier coupled between the generator and the speaker for amplifying the electrical signal sufficiently to provide an ultrasonic sound level from the speaker of at least 100 decibels.

4. Apparatus for repelling rats and mice comprising:

an oscillator for generating an electrical signal within the ultrasonic frequency range;

a sawtooth generator coupled to the oscillator for causing a periodic sweeping of the generated signal within the frequency range of 81.5 kHz. to 30 kHz.;

a signal source asynchronous with the sawtooth generator also coupled to the oscillator for modulating the amplitude of the electrical signal;

a speaker coupled to the oscillator; and an amplifier coupled between the oscillator and the speaker for amplifying the electrical signal sufficiently to provide an ultrasonic sound level from the speaker of at least 100 decibels.

5. Apparatus according to claim 4 in which the oscillator comprises a square wave generator.

6. Apparatus according to claim 4 further comprising a switch coupled between the oscillator and the speaker and means for repeatedly turning the switch on and off to effect interruptions in the ultrasonic sound output of the speaker.

7. Apparatus according to claim 4 in which the means for repeatedly turning the switch on and off comprises a square wave oscillator for turning the switch on and off for equal periods of time, the square wave oscillator being asynchronous with both the sawtooth generator and the amplitude modulating signal source.

8. Apparatus for repelling rats and mice comprising:

an oscillator for generating an electrical signal within the ultrasonic frequency range;

a sawtooth generator coupled to the oscillator for causing a periodic sweeping of the generated signal within the frequency range of 18.5 kHz. to 30 kHz.;

a signal source asynchronous with the sawtooth generator also coupled to the oscillator for modulating the amplitude of the electrical signal;

a plurality of speakers;

a plurality of switches coupling respective ones of the speakers to the oscillator; and means for repeatedly and sequentially opening and closing the switches, each switch being opened upon the closing of the next succeeding switch.

9. Apparatus according to claim 8 in which the means for opening and closing the switches comprises an astable multivibrator coupled to a plurality of delay multivibrators to sequentially energize the delay multivibrators, each delay multivibrator being coupled to a respective one of the switches, each switch being closed responsive to the energization of its associated delay multivibrator.

10. Apparatus according to claim 9 comprising three switches and three delay multivibrators and in which each delay multivibrator has a period equal to one-third of the interval between pulses provided by the astable multivibrator.

11. A method of repelling rats and mice comprising the steps of:

generating an electrical signal within the ultrasonic frequency range;

modulating the frequency of the electrical signal by causing it to cyclically sweep through a range of frequencies between 18.5 kHz. and 30 kHz.;

modulating the amplitude of the electrical signal asynchronously with the cyclical sweep; and converting the modulated signal to air vibrations of a magnitude sufficient to produce an ultrasonic sound level of at least 100 decibels.

* * * * *

PO-1050
(5/69)

UNITED STATES PATENT OFFICE
CERTIFICATE OF CORRECTION

Patent No. 3,636,559          Dated January 18, 1972

Inventor(s) Dominic Del Grande, North Hollywood
Donald C. Erdman, Pasadena, both of California It is certified that error appears in the above-identified patent and that said Letters Patent are hereby corrected as shown below:

Column 1, line 37, after "that" delete "if" and insert --it--;

Column 3, line 4, after "fed" insert --to--;

line 43, after "three" delete the hyphen;

line 44, after "couple" delete "to" and insert --the--;

Column 4, line 11, after "18" delete --is--;

Column 5, line 38, delete "claim 4" and insert --claim 6--.

Signed and sealed this 20th day of June 1972.

(SEAL)
Attest:

EDWARD M. FLETCHER, JR.        ROBERT GOTTSCHALK
Attesting Officer               Commissioner of Patents